United States Patent [19]

Shirahata et al.

[11] Patent Number: 4,604,293
[45] Date of Patent: Aug. 5, 1986

[54] PROCESS FOR PRODUCING MAGNETIC RECORDING MEDIUM

[75] Inventors: Ryuji Shirahata; Akio Yanai, both of Kanagawa, Japan

[73] Assignee: Fuji Photo Film Co., Ltd., Kanagawa, Japan

[21] Appl. No.: 788,177

[22] Filed: Oct. 16, 1985

[30] Foreign Application Priority Data

Oct. 16, 1984 [JP] Japan .................. 59-216922
Oct. 16, 1984 [JP] Japan .................. 59-216923

[51] Int. Cl.$^4$ ............................................ H01F 10/02
[52] U.S. Cl. ...................................... 427/42; 427/132; 427/251; 427/296
[58] Field of Search .................. 427/42, 132, 251, 296

Primary Examiner—Bernard D. Pianalto
Attorney, Agent, or Firm—Sughrue, Mion, Zinn, Macpeak, and Seas

[57] ABSTRACT

A process for producing a magnetic recording medium comprising heating a magnetic material evaporation source with at least one scanning electron beam and depositing a vapor of a magnetic material emitted from the magnetic material evaporation source onto a non-magnetic substrate tape or web which is continuously moving in a vacuum atmosphere, the magnetic material evaporation source being disposed substantially parallel to the width direction of the non-magnetic substrate tape or web to form a magnetic thin film thereon, wherein the scanning frequency of the electron beams is about 2wv/n Hz or more, in which v m/min is the moving speed of the non-magnetic substrate; w m is the scanning width of the electron beams on said magnetic material evaporation source; and n is the number of the electron beams. The magnetic thin film magnetic recording medium has improved $(dB/dH)_{max}$ and an excellent envelope of reproduced signals.

9 Claims, 2 Drawing Figures

PROCESS FOR PRODUCING MAGNETIC RECORDING MEDIUM

FIELD OF THE INVENTION

The present invention relates to a process for producing a magnetic recording medium which comprises vacuum-depositing a maganetic thin film onto a moving non-magnetic substrate tape or web made of, for example, high molecular molded material. More particularly, the present invention relates to a process for producing a magnetic recording medium having improved magnetic properties and electromagnetic conversion properties.

BACKGROUND OF THE INVENTION

As magnetic recording media there have heretofore been widely used coating type magnetic recording media produced by coating a non-magnetic substrate with a dispersion of a powdered magnetic material such as a magnetic oxide, e.g., gamma-$Fe_2O_3$, Co-doped gamma-$Fe_2O_3$, $Fe_3O_4$, Co-doped $Fe_3O_4$, a Berthollide compound of gamma-$Fe_2O_3$ and $Fe_3O_4$, a Co-doped Berthollide compound, and $CrO_2$, or a magnetic alloy powder mainly containing Fe, Co, and Ni, in an organic binder such as vinyl chloride-vinyl acetate copolymer, styrene-butadiene copolymer, epoxy resin and polyurethane, and then drying the dispersion.

With increasing need for high density magnetic recording in recent years, ferromagnetic metal thin films formed by vacuum deposition, sputtering or ion plating, i.e. a "metal thin film" type recording medium using no binder have attracted attention, and efforts have been made to put such a recording medium into practical use.

In conventional coating type magnetic recording media, generally a metal oxide having a small saturation magnetization is used as a magnetic material, and the volume content of the magnetic material in the magnetic layer is only from 30 to 50%. Therefore, the conventional coating type magnetic recording media have limited use for high output and high density recording media. Furthermore, the conventional magnetic recording media have the disadvantage that the production process is complicated and requires a large-scale incidental facility for recovering solvents and preventing pollution.

The metal thin film type magnetic recording media are advantageous in that a ferromagnetic metal having a higher saturation magnetization than the oxide magnetic materials can be made into an extremely thin flim without using a non-magnetic material such as an organic binder. For higher density magnetic recording, the gap width of the magnetic head for recording and replaying is typically less than 1.0 micrometer, and the depth of the magnetic recording layer in which the recording is made is shallower than with conventional materials.

Therefore, the metal thin film type magnetic recording medium, which can be used throughout the thickness of the magnetic layer thereof for recording of magnetic signals, is extremely suitable as a high output and high density recording medium. Of various processes for the production of metal thin film type magnetic recording media, the vacuum deposition process is advantageous since the rate of film formation is high and the production process is a simple dry process which requires no treatment of waste liquid. In particular, the oblique incidence vacuum deposition process, in which a deposition flow of a magnetic metal is incident obliquely upon the plane of the non-magnetic substrate, has the practical advantage that it can be performed in a simple manner by means of a simple apparatus to obtain a thin metal film having excellent magnetic properties.

To produce a magnetic recording tape by vacuum-depositing a magnetic thin film onto a tape-like non-magnetic substrate, a process as described in Japanese Patent Application (OPI) No. 19200/79 or U.S. Pat. No. 4,220,117 can be employed in which a vapor flow of a magnetic material which has been heated by irradiation with electron beams is directed and deposited onto a moving tape-like non-magnetic substrate (the term "OPI" used herein means a "published unexamined Japanese Patent Application"). The vacuum deposition type magnetic recording medium thus produced provides higher output than the conventional coating type magnetic recording medium and is extremely suitable as a magnetic tape for 8 mm VTR or digital audio equipment. In the vacuum deposition type magnetic recording medium, in order to reduce the noise and to further improve the S/N ratio, an oxidizing gas such as oxygen is introduced during the deposition of the magnetic material as described in U.S. Pat. No. 4,450,186. However, by the introduction of an oxidizing gas, the magnetic properties of the magnetic recording medium, particularly $(dB/dH)_{max}$ (the maximum value of the differential value of the magnetization curve), are deteriorated, improvement in this respect is desirable. Furthermore, the vacuum deposition type magnetic recording medium produced by the conventional electron beam heating process does not provide a sufficient reproduction stability in the envelope of reproduced waves of video signals, especially high frequency signals, and improvement in this respect also has been desired.

SUMMARY OF THE INVENTION

An object of the present invention is to provide an improved vacuum evaporation process without the above disadvantages, and more specifically, a process for producing a magnetic thin film type magnetic recording medium having improved magnetic properties, particularly $(dB/dH)_{max}$.

Another object of the present invention is to provide a process for producing a magnetic thin film type magnetic recording medium having excellent electromagnetic conversion properties, particularly an excellent envelope of reproduced signals.

As a result of intensive studies by the present inventors on vacuum deposition by electron beam scanning, it has now been found that these and other objects can be achieved by limiting the frequency of the electron beam scanning within a specified range.

Namely, the present invention provides a process for producing a magnetic recording medium which comprises the steps of heating a magnetic material evaporation source with scanning beams and depositing a vapor of a magnetic material emitted from the magnetic material evaporation source onto a non-magnetic substrate tape or web moving continuously in a vacuum atmosphere, the magnetic material evaporation source being disposed substantially parallel to the width direction of the non-magnetic substrate tape or web to form, a magnetic thin film on the substrate, wherein the scanning frequency of the electron beams is at least about 2wv/n Hz in which v m/min is the moving speed of the non-magnetic substrate; w m is the scanning width of the electron beams on the magnetic material evaporation source; and n is the number of the electron beams.

DETAILED DESCRIPTION OF THE INVENTION

Figure 1:
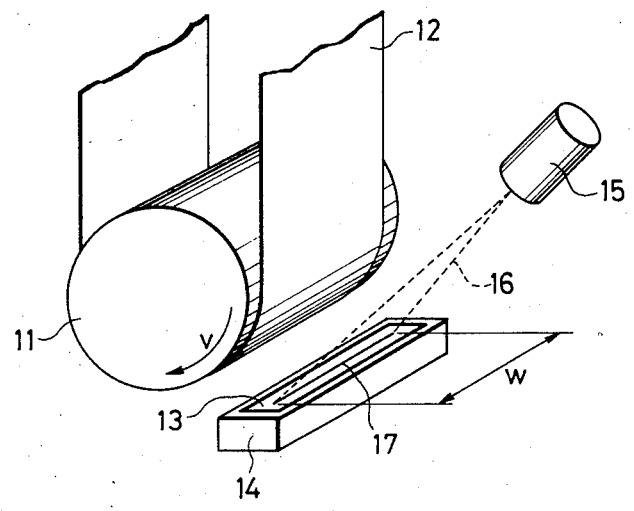
FIG. 1 shows an example of one embodiment of an apparatus for executing the process of the present invention for producing a magnetic recording medium using one electron beam.

The conventional techniques and apparatuses of the vacuum-deposition method for producing magnetic recording media which can be used in the present invention are disclosed in U.S. Pat. Nos. 2,220,117, 3,342,632, 3,342,633, 3,700,500, 4,414,507, 4,446,816, 4,454,836 and 4,477,489.

One or more electron beams can be used in the process according to the present invention.

The present invention is further illustrated by reference to the FIGS. 1 and 2, although the figures are intended as merely illustrative of suitable apparatuses for use in the process of the present invention, and are not to be construed as limiting the present invention in any way. One of ordinary skill in the art will readily recognize that suitable modifications in the apparatuses shown can be made without departing from the spirit and scope of the present invention.

In the figures, a non-magnetic substrate tape or web 12 is carried along a cylindrical cooling can 11 provided in a vacuum vessel (not shown in figures) equipped with a proper vacuum pumping system. A crucible 14 for evaporating a magnetic material 13 by heating is disposed beneath the cooling can 11. The magnetic material 13 is heated by irradiation with electron beam 16 (16A and 16B in FIG. 2, same hereinafter) irradiated from an electron gun 15 (15A and 15B in FIG. 2, same hereinafter). The magnetic material 13 thus heated emits a vapor flow of the magnetic material which then reaches the surface of the tape like substrate 12 which is moving round the surface of the cooling can 11 at a rate of v m/min. so that a magnetic thin film is deposited thereon. The electron beam 16 emitted from the electron gun 15 is arranged to scan a scanning zone 17 having a scanning width of w m on the magnetic material 13 in the crucible 14. The scanning zone is disposed substantially parallel to the width of the non-magnetic substrate tape or web 12. If two or more electron guns, for example, 15A and 15B are used as shown in FIG. 2, the electron beams, for example, 16A and 16B in FIG. 2 emitted from these electron guns are arranged to differ from each other in phase of scanning frequencies thereof and these electron beams do not strike the same place on the scanning zone 17 simultaneously.

Defining the moving speed of the non-magnetic substrate tape or web 12 is v m/min, the scanning width of the scanning zone 17 as w m, and the number of the electron beams scanning the scaning zone as n, then according to the present invention the scanning frequency of the electron beams is generally about 2wv/n Hz or more, preferably about 4wv/n Hz or more. If two or more electron beams are used, these electron beams are preferably set to differ in phase by 360°/n from each other where n is the number of the electron beams.

The value of w is preferably in the range of from one to two times the width of the susbstrate. The value of v is preferably in the range of from 10 to 200 m/min. The value of n is preferably in the range of from 1 to 5.

The accelation voltage of the elctron beam(s) used in the present invention is in the range of from 5 to 100 kV, preferably from 10 to 75 kV.

The distance between the evaporation source and the nearest position to the evaporation source of the substrate is in the range of from 5 to 80 cm, preferably from 10 to 50 cm.

In the production of a magnetic recording medium by the process, of the present invention, an example of the ferromagnetic metal for forming the magnetic thin film includes a metal such as Fe, Co, and Ni or a ferromagnetic alloy such as Fe-Co, Fe-Ni, Co-Ni, Fe-Co-Ni, Fe-Rh, Fe-Cu, Fe-Si, Co-Cu, Co-Au, Co-Y, Co-La, Co-Pr, Co-Gd, Co-Sm, Co-Pt, Co-Si, Co-Mn, Co-P, Ni-Cu, Mn-Bi, Mn-Sb, Mn-Al, Fe-Cr, Co-Cr, Ni-Cr, Fe-P, Ni-P, Co-Ni-P, Co-Ni-B, Co-Ni-Ag, Co-Ni-Cr, Fe-Co-Cr, Fe-Co-Ni-Cr, Co-Ni-Zn, Co-Ni-W and Fe-Co-NiP, preferably Co, Fe or an alloy mainly comprising Co or Fe are used.

The thickness of the magnetic thin film should be sufficient to provide an output for a magnetic recording medium adequate to permit the desired high density recording, and it is generally in the range of from about 0.02 to 5.0 micrometer, preferably from about 0.05 to 2.0 micrometer. In order to enhance the coercive force of the magnetic film, a gas such as $O_2$, $CO_2$, $N_2$, $NH_3$ and styrene may be introduced during the vacuum deposition stage as described in U.S. Pat. Nos. 4,323,629 and 4,450,186 so that an element such as O, N and C may be contained in the magnetic thin film.

An example of the non-magnetic substrate tape or web includes a plastic base such as polyethyrene terephthalate, polimide, polyamide, polyvinyl chloride, cellulose triacetate, polycarbonate, polyethylene naphthalate and polyphenylene sulfide or a metal band such as Al, Al alloy, Ti, Ti alloy, and stainless steel, preferably polyethylene terephthalate, polyimde and polyamide are employed. The thickness of the non-magnetic substrate tape or web is in the range of from 3 to 80 micrometers, and the width thereof is not particularly limitted.

In order to supply the magnetic material 13 evaporated from the crucible 14, a mechanism as described in A. Feuerstein et al, *"Proceedings of the 5th International Conference on Video and Data Recording"* (1984) for continuously or intermittently feeding a linear, particulate, band-shaped or rod-shaped magnetic material downwardly, upwardly or horizontally to the crucible 14 may be provided.

Furthermore, if the oblique incident vacuum deposition process, in which the vapor flow of the magnetic material is incident obliquely upon the substrate tape or web, is employed, the incident angle is preferably from about 30° to 90° as described in U.S. Pat. Nos. 3,342,632 and 3,342,633.

The non-magnetic substrate tape or web may be provided with a primary coating layer of an organic or inorganic material thereon. The magnetic thin films may be formed in multiple layers on the tape-like non-magnetic substrate, and these layers may optionally have an intermediate layer of an organic or inorganic material interposed therebetween. Alternatively, the magnetic film may be provided with a protective layer of an organic or inorganic material thereon. Examples of these method are described in U.S. Pat. Nos. 3,350,180, 4,333,985, 3,516,860 and 4,245,008.

This resulted magnetic recording medium of the present invention can be used in forms of disc, sheet, card and the like.

The present invention will be further illustrated hereinafter in but is not to be construed as being limited to the following examples. Unless otherwise indicated, all parts and ratios are by weight.

EXAMPLE 1

A ferromagnetic thin film was formed on a polyethylene terephthalate film having a thickness of 12 micrometer by using an apparatus provided with one electron gun shown in FIG. 1 to prepare a magnetic recording medium, wherein the incident asngle is 45°, and the distance between the evaporation sourse and the nerest position to the evaporation source of the substrate is 30 cm. As an evaporation source, a crucible charged with a Co-Ni alloy (containing 18 wt% of Ni) was used. An electron beam accelerated by 30 kv was scanned parallel to the width direction of the polyethylene terephthalate film substrate to effect vacuum deposition. Oxygen gas was introduced through a nozzle disposed at the vicinity of the vapor flow with the pressure maintained at $2.0\times10^{-4}$ Torr during the vacuum deposition stage so that a magnetic thin film of 0.12 micrometer thickness was deposited on the substrate. Several magnetic tapes were prepared with the scanning width of the electron beam maintained at 0.5 m by altering the moving speed of the polyethylene terephthalate film substrate and the electron beam scanning frequency. The magnetic tapes thus-prepared were measured for $(dB/dH)_{max}$ value on the B-H curve and for the envelope characteristics were determined upon the reproduction of a 5 MHz signal recorded thereon by means of a VTR having a tape-head relative speed of 3.75 m/sec. Table 1 shows the results of the measurements.

TABLE 1

| Sample No. | Scanning Width (m) | Moving Speed (m/min) | Electron Beam Scanning Frequency (Hz) | $\left(\dfrac{dB}{dH}\right)_{max}$ | En- velope |
| --- | --- | --- | --- | --- | --- |
| 1 | 0.5 | 50 | 12 | 50 | E |
| 2 | 0.5 | 50 | 25 | 75 | D |
| 3 | 0.5 | 50 | 50 | 325 | B |
| 4 | 0.5 | 50 | 100 | 420 | A |
| 5 | 0.5 | 50 | 180 | 480 | A |
| 6 | 0.5 | 100 | 25 | 60 | E |
| 7 | 0.5 | 100 | 50 | 90 | D |
| 8 | 0.5 | 100 | 100 | 340 | B |
| 9 | 0.5 | 100 | 200 | 480 | A |
| 10 | 0.5 | 100 | 380 | 500 | A |

Note:
1 The magnetization curve (B-H curve) characteristic was determined under the application of an external magnetic field of 5,000 Ce by means of a vibrating sample magnetometer, and the $\left(\dfrac{dB}{dH}\right)_{max}$ was determined as a relative value.

2 The envelope was evaluated from the form of the envelope curve of the reproduction signal by using an osilloscope in accordance with the following five grades:
A Excellent
B good
C Acceptable
D Poor
E Very poor
(These conditions and evaluation were used also in the following Examples.)

The results in Table 1 demonstrate that when the electron scanning width is w m and the moving speed of the polyethylene terephthalate film substrate is v m/min, the magnetic tape prepared at an electron beam scanning frequency of about 2wv Hz or more (e.g., 50 Hz or more for 0.5 m electron beam scanning width and 100 m/min moving speed; 100 Hz or more for 0.5 m electrom beam scanning width and 100 m/min moving speed) provides an improved $(dB/dH)_{max}$ value and excellent envelope characteristic.

It was also confirmed that the magnetic tape prepared at a scanning frequency of about 4wv Hz or more (e.g., 100 Hz or more for 0.5 m scanning width and 50 m/min moving speed; 200 Hz or more for 0.5 m scanning width and 100 m/min moving speed) shows an extremely excellent $(dB/dH)_{max}$ value and envelope characteristic.

EXAMPLE 2

A ferromagnetic thin film of Co-Cr (Cr content: 5 wt%) was vacuum-deposited onto a polyimide film of 12.5 micrometer thicknss in the same manner as in Example 1 to prepare a magnetic recording medium. The vacuum deposition was executed with the pressure maintained at $1.5\times10^{-5}$ Torr so that the thickness of the magnetic thin film thus-deposited was 0.2 micrometer. Several magnetic tape samples were prepared with various electron beam scanning frequencies, while maintaining the electron beam scanning width and polyimide film moving speed constant. These samples obtained were measured for the $(dB/dH)_{max}$ value and the envelope characteristic as in Example 1. The results of the measurements are shown in Table 2.

TABLE 2

| Sample No. | Scanning Width (m) | Moving Speed (m/min) | Electron Beam Scanning Frequency (Hz) | $\left(\dfrac{dB}{dH}\right)_{max}$ | En- velope |
| --- | --- | --- | --- | --- | --- |
| 11 | 0.4 | 80 | 15 | 55 | E |
| 12 | 0.4 | 80 | 30 | 85 | D |
| 13 | 0.4 | 80 | 65 | 330 | B |
| 14 | 0.4 | 80 | 130 | 475 | A |
| 15 | 0.4 | 80 | 250 | 505 | A |
| 16 | 0.4 | 80 | 30 | 60 | E |
| 17 | 0.4 | 80 | 65 | 80 | D |
| 18 | 0.4 | 80 | 130 | 320 | B |
| 19 | 0.4 | 80 | 260 | 470 | A |
| 20 | 0.4 | 80 | 450 | 495 | A |

These results show that when the electron beam scanning width is w m and the polyimide film moving speed is v m/min, the magnetic tapes prepared at an electron beam scanning frequency of about 2wv Hz or more (e.g., 64 Hz or more for 0.4 m scanning width and 80 m/min moving speed; 128 Hz or more for 0.8 m scanning width and 80 m/min moving speed) provides an improved $(dB/dH)_{max}$ value and excellent envelope characteristics.

It was also confirmed that the magnetic tape prepared at a scanning frequency of about 4wv Hz or more (e.g., 128 Hz or more for 0.4 m scanning width and 80 m/min moving speed; 256 Hz or more for 0.8 m scanning width and 80 m/min moving speed) shows an extremely excellent $(dB/dH)_{max}$ value and envelope characteristic.

EXAMPLE 3

Figure 2:
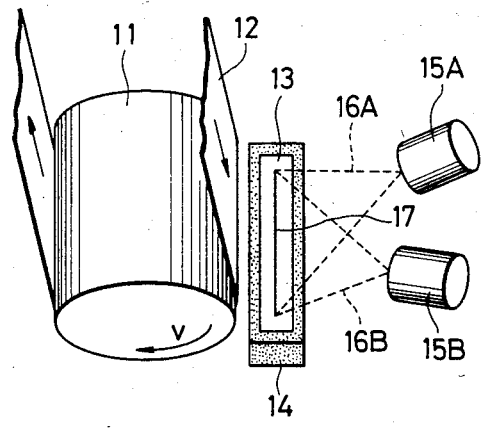
FIG. 2 shows another embodiment of an apparatus for executing the process of the present invention for producing a magnetic recording medium using two electron beams.

A ferromagnetic thin film was vacuum-deposited onto a polyethylene terephthalate film substrate of 12 micrometer thickness using an apparatus provided with two electron guns as shown in FIG. 2 to prepare a magnetic recording medium. As magnetic metal material, Co-Ni alloy (Ni content: 25 wt%) was charged in the crucible. The magnetic metal was heated and evaporated by irradiation with electron beams accerelated by a voltage of 25 kv emitted from the two electron guns. The electron beam scanning width and scanning frequency were 0.5 m and 30 Hz, respectively, and the moving speed of the polyethylene terephthalate film substrate was 50 m/min. Oxygen gas was introduced in the vicinity of the vapor flow of the magnetic metal material with the pressure maintained at $1.8 \times 10^{-4}$ Torr during the evaporation stage so that a magnetic thin film of 0.13 micrometer thick was formed on the substrate film to prepare magnetic tapes. Sample No. 21 was prepared using only one electron gun 15, and Sample No. 22 was prepared using only one electron gun 16. Sample Nos. 23, 24, and 25 were prepared using both the two electron guns 15 and 16 with the phase difference of scanning frequency between the two electron guns maintained at 0°, 90° and 180°, respectively. Sample No. 26 was prepared using both the two electron guns having a scanning frequency of 60 Hz and the phase difference of scanning frequency therebetween maintained at 180°.

These Samples were measured for the $(dB/dH)_{max}$ value and the envelope characteristic in the same manner as in Example 1. The results of the measurements are shown in Table 3.

TABLE 3

| Sample No. | $\left(\dfrac{dB}{dH}\right)_{max}$ | Envelope |
| --- | --- | --- |
| 21 | 80 | D |
| 22 | 85 | D |
| 23 | 75 | D |
| 24 | 315 | B |
| 25 | 475 | A |
| 26 | 500 | A |

These results show that magnetic tapes formed according to the invention using a vapor emitted from a magnetic metal material which has been heated by two scanning electron beams which have different phases from each other provide an improved value of $(dB/dH)_{max}$ and excellent envelope characteristics.

It was also confirmed that the magnetic tape prepared with a phase defference between the electron beams maintained at 360°/n (180° for two electron beams) had an extremely excellent $(dB/dH)_{max}$ value and envelope characteristic.

It was further shown by Sample No. 26 that the magnetic tape prepared with electron beams having a scanning frequency of 60 Hz, which is greater than 4wv/n Hz (50 Hz for 0.5 m scanning width, 50 m/min moving speed and two electron beams) shows more extremely excellent $(dB/dH)_{max}$ value and envelope characteristic.

EXAMPLE 4

A ferromagnetic thin film Co-Cr (Cr content: 5 wt%) was formed on a polyimide film substrate of 12.5 micrometer thickness using the same apparatus as in Example 1 except to provide with three electron guns to prepare a magnetic recording medium. The vacuum deposition was executed with the pressure maintained at $1.5 \times 10^{-5}$ Torr so that the thickness of the magnetic thin film thus-deposited was 0.25 micrometer. The electron beam scanning width and scanning frequency were 0.8 m and 50 Hz, respectively, and the moving speed of the polyimide film substate was 80 m/min. Sample No. 27 was prepared using only one electron beam. Sample Nos. 28, 29, and 30 were prepared using all three electron beams with the phase difference of scanning frequency between the three electron beams maintained at 0°, 60° and 120°, respectively. Sample No. 31 was prepared using all three electron beams having a scanning frequency of 100 Hz with the phase difference of scanning frequency between the three electron beams maintained at 120°. These Samples were measured for the $(dB/dH)_{max}$ value and envelope characteristics in the same manner as in Example 1. The results of the measurements are shown in Table 4.

TABLE 4

| Sample No. | $\left(\dfrac{dB}{dH}\right)_{max}$ | Envelope |
| --- | --- | --- |
| 27 | 75 | D |
| 28 | 70 | D |
| 29 | 295 | B |
| 30 | 495 | A |
| 31 | 505 | A |

These results demonstrate that the vacuum deposition type magnetic tapes prepared according to the present invention using three electron beams with scanning frequency phases differing are different from each other provide an improved $(dB/dH)_{max}$ value and excellent envelope characteristics.

It was also confirmed that the magnetic tape prepared with the phase difference maintained at 360°/n (120° for three electron beams) shows an extremely excellent $(dB/dH)_{max}$ value and envelope characteristic.

It was further confirmed that the magnetic tape (Sample No. 31) prepared with electron beams having a scanning frequency of 100 Hz, which is greater than 4wv/n (85.3 Hz 0.8 m scanning width, 80 m/min moving speed and three electron beams) had a further improved $(dB/dH)_{max}$ value and excellent envelope characteristics.

The vacuum deposition process of the present invention for production of a magnetic recording medium produces a magnetic recording medium having improved magnetic properties and electromagnetic conversion properties. In high density recording, if the recording wavelength becomes smaller, the self-demagnetization loss of the magnetic recording medium is increased, and therefore ahigher $(dB/dH)_{max}$ value is required. In accordance with the process of the present invention, a magnetic recording medium which meets this requirement can be produced. An excellent envelope is necessary to provide an excellent reproduced video image. In accordance with the process of the present invention, a metal thin film type magnetic recording medium having an improved envelope can be produced.

What is claimed is:

1. A process for producing a magnetic recording medium comprising the steps of heating a magnetic material evaporation source with at least one scanning electron beam and depositing a vapor of a magnetic material emitted from said magnetic material evaporation source onto a non-magnetic substrate continuously moving in a vacuum atmosphere, said magnetic material evaporation source being disposed substantially parallel to the width direction of said non-magnetic substrate to form a magnetic thin film on said substrate, wherein the scanning frequency of said electron beam(s) is at least about 2wv/n Hz, in which v m/min is the moving speed of the non-magnetic substrate; w m is the scanning width of the electrom beam(s) on said magnetic material evaporation source; and n is the number of said electron beam(s).

2. The process as claimed in claim 1, wherein said electron beam(s) scanning frequency is at least about 4wv/n Hz in which v m/min is the moving speed of said non-magnetic substrate; w m is the scanning width of the electron beam(s) on said magnetic material evaporation source; and n is the nimber of the electron beam(s).

3. The process as claimed in claim 1, wherein at least two electron beams are used to heat said magnetic material evaporation source, said electron beams being out of phase.

4. The process as claimed in claim 3, wherein at least two electron beams are used to heat said magnetic material evaporation source, the phase of said electron beams differing by 360°/n, wherein n is the number of the electron beams.

5. A process for producing a magnetic recording medium comprising the steps of heating a magnetic material evaporation source with at least two sanning electron beams and depositing a vapor of a magnetic material emitted from said magnetic material evaporation souce onto a non-magnetic substrate continuously moving in a vacuum atmosphere, said magnetic material evaporation source disposed substantially parallel to the width direction of said non-magnetic substrate, said electron beams being out of phase.

6. The process as claimed in claim 3, wherein the electron beams scanning frequency is at least about 4wv/n Hz, in which v m/min is the moving speed of said non-magnetic substrate; w m is the width of the electron beams being scanned on said magnetic material evaporation source; and n is the number of the electron beams.

7. The process as claimed in claim 4, wherein the electron beams scanning frequency is at least about 4wv/n Hz, in which v m/min is the moving speed of said non-magnetic substrate; w m is the scanning width of the electron beams being scanned on said magnetic material evaporation source; and n is the number of the electron beams.

8. The process as claimed in claim 1, wherein the accelation voltage of said electron beam(s) is in the range of from 5 to 100 kV.

9. The process as claimed in claim 8, wherein the accelation voltage of said electron beam(s) is in the range of from 10 to 75 kV.

* * * * *